United States Patent
Kappes et al.

(10) Patent No.: US 10,641,287 B2
(45) Date of Patent: May 5, 2020

(54) FAN CONTAINMENT CASE FOR A GAS TURBINE ENGINE

(71) Applicant: Rolls-Royce Corporation, Indianapolis, IN (US)

(72) Inventors: Matthew J. Kappes, Greenwood, IN (US); Robert W. Heeter, Noblesville, IN (US); Benedict N. Hodgson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 761 days.

(21) Appl. No.: 15/257,206

(22) Filed: Sep. 6, 2016

(65) Prior Publication Data
US 2018/0066675 A1   Mar. 8, 2018

(51) Int. Cl.
| | |
|---|---|
| *F04D 29/52* | (2006.01) |
| *F01D 21/04* | (2006.01) |
| *F04D 29/32* | (2006.01) |
| *F04D 29/16* | (2006.01) |
| *F02K 3/06* | (2006.01) |
| *F04D 19/00* | (2006.01) |

(52) U.S. Cl.
CPC ........... *F04D 29/526* (2013.01); *F01D 21/04* (2013.01); *F02K 3/06* (2013.01); *F04D 19/002* (2013.01); *F04D 29/164* (2013.01); *F04D 29/324* (2013.01); *F05D 2220/32* (2013.01); *F05D 2300/224* (2013.01); *F05D 2300/603* (2013.01); *Y02T 50/672* (2013.01)

(58) Field of Classification Search
CPC .............................. F01D 25/24; F01D 21/045
USPC .......................................................... 415/9
See application file for complete search history.

(56) References Cited

U.S. PATENT DOCUMENTS

| | | | |
|---|---|---|---|
| 6,059,524 A * | 5/2000 | Costa | F01D 21/045 415/200 |
| 6,652,222 B1 * | 11/2003 | Wojtyczka | B32B 3/12 415/200 |
| 6,814,541 B2 | 11/2004 | Evans et al. | |

(Continued)

FOREIGN PATENT DOCUMENTS

| | | |
|---|---|---|
| EP | 2 495 400 | 9/2012 |
| JP | H10158417 | 11/1996 |
| WO | WO 2012/065155 | 5/2012 |

OTHER PUBLICATIONS

Pereira, J. Michael, et al., "Ballistic Impact Response of Kevlar 49 and Zylon Under Conditions Representing Jet Engine Fan Containment", and Abstract, (Jan. 1, 2007), NASA Technical Reports Server (NTRS) URL: http://ntrs.nasa.gov/search.jsp?print=yes&R=20080013150, (PDF printed Sep. 6, 2016) (11 pages).

(Continued)

*Primary Examiner* — Justin D Seabe
*Assistant Examiner* — Cameron A Corday
(74) *Attorney, Agent, or Firm* — McCracken & Gillen LLC (57) ABSTRACT

According to one aspect, a fan containment case for a gas turbine engine is provided which includes a barrel having a first band of material on an outside of the barrel. The first band is made of carbon fiber composite. The barrel further includes a second band of material inboard of the fan case and made of poly p-phenylene-2,6-benzobisoxazole (PBO) composite. The barrel also includes a third band of material made of carbon fiber composite inboard of the second band.

20 Claims, 6 Drawing Sheets

(56) References Cited

U.S. PATENT DOCUMENTS

| | | | |
|---|---|---|---|
| 8,016,543 B2 | 9/2011 | Braley et al. | |
| 8,021,102 B2 | 9/2011 | Xie et al. | |
| 8,827,629 B2 | 9/2014 | Voleti et al. | |
| 2006/0093847 A1* | 5/2006 | Hornick | F01D 21/045 428/523 |
| 2006/0252334 A1 | 11/2006 | LoFaro et al. | |
| 2007/0081887 A1 | 4/2007 | Xie et al. | |
| 2008/0145215 A1 | 6/2008 | Finn et al. | |
| 2008/0206048 A1 | 8/2008 | Coupe et al. | |
| 2011/0052382 A1 | 3/2011 | Cheung | |
| 2014/0003923 A1 | 1/2014 | Finnigan et al. | |

OTHER PUBLICATIONS

Xie, Ming, "Intelligent Engine Systems, Smart Case System", NASA/CR-2008-215233, May 2008, and Abstract (May 1, 2008), NASA Technical Reports Server (NTRS) URL: http://ntrs.nasa.gov/search.jsp?print=yes&R=20080023404, (PDF printed Sep. 6, 2016) (39 pages).

Extended European search report dated Feb. 8, 2018, for European application No. 17186115.6-1006, Applicant, Rolls-Royce Corporation (13 pages).

Extended European Search Report dated Feb. 8, 2018, for European application No. 17184680.1-1006, Applicant, Rolls-Royce Corporation (13 pages).

Chin, et al., "Temperature and humidity aging of poly(p-phenylene-2,6-benzobisoxazole) fibers: Chemical and physical characterization", Polymer Degradation and Stability, vol. 92, Issue 7, Jul. 2007, pp. 1234-1246, Downloaded from: http://www.ncnr.nist.gov/programssans/pdf/publications/0599.pdf (13 pages).

* cited by examiner

FIG. 11 ature of the present disclosure.
FAN CONTAINMENT CASE FOR A GAS TURBINE ENGINE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present disclosure generally relates to gas turbine engines. More particularly, but not exclusively, the present disclosure relates to fan containment cases for gas turbine engines.

BACKGROUND

Gas turbine engines include a fan having fan blades in front of the engine. The fan may be contained in a hardwall fan containment case. During operation any one of the fan blades may break off from the fan and impact the hardwall fan containment case. This is generally referred to as fan blade-off (FBO). After a turbine engine fan loses a blade, the loads on the fan case rise well above those experienced in normal flight conditions because of the fan imbalance. During engine shut down, which is typically about a few seconds, cracks can propagate rapidly in the hardwall fan case from the damage caused by the impact of the FBO. If the hardwall fan case fails completely, then the consequences for the engine and aircraft could be catastrophic.

The hardwall fan case is generally made of titanium and is designed to stop a broken blade. Titanium or other metal in a hardwall fan case further increase the weight of the gas turbine engine. Thus, there is a need for a lighter hardwall fan case without compromising a structural strength of the fan case to withstand an impact of a FBO.

SUMMARY

According to one aspect, a fan containment case for a gas turbine engine having a barrel comprising a first band of material on an outside of the barrel is provided. The first band is made of carbon fiber composite. A second band of material inboard of the fan case is provided, wherein the second band is made of poly p-phenylene-2,6-benzobisoxazole (PBO) composite. A third band of material inboard of the second band is also provided, wherein the third band is made of carbon fiber composite.

According to another aspect, a gas turbine engine having a fan containment case including a barrel comprising a first band of material on an outside of the barrel is provided. The first band is made of carbon. A second band of material inboard of the fan case is provided, wherein the second band is made of poly p-phenylene-2,6-benzobisoxazole (PBO), and a third band of material inboard of the second band is also provided, wherein the third band is made of carbon.

DETAILED DESCRIPTION

There are at least two types of fan containment cases utilized in gas turbine engine technology. One is a softwall fan containment case and the other is a hardwall fan containment case. Both of the softwall and hardwall fan cases include a barrel and may include a fan track liner that surround a rotor having fan blades. Each of the softwall and hardwall fan cases is constructed for a different purpose. A softwall fan case is intended to allow a high energy debris such as a portion of the broken off fan blade to penetrate through the fan track liner and the barrel. In the softwall fan cases, the barrel is wrapped by a containment blanket and the high energy debris that penetrates through the fan track liner and the barrel is caught and contained by the containment blanket. The barrel may be metallic, such as aluminum, or composite, and the containment blanket may be made of dry fabric wrap comprising an aramid fiber such as Kevlar™. The fan track liner may be comprised of an abradable material such as polymer, an epoxy, and/or a honeycomb material or other suitable material. The fan blades may be made of a metal, such as titanium, or an alloy of various metals. The barrel may sustain significant damage (including cracks and/or holes) from a FBO event. The fan track liner and the containment blanket are disposed radially away from an axial fluid flow path through the fan and more specifically, the fan track liner is disposed between the barrel and the fluid flow path. The barrel forms a structure between the fan track liner and the containment blanket.

Hardwall fan containment cases are intended to strictly contain the high energy debris projectiles within the fan case and minimize the penetration of broken off fan blades into the barrel. As such, the hardwall fan case may not include a wrapped containment blanket around and on the outside surface of the barrel. In a FBO event, the broken off and fast moving fan blade may cut through the fan track liner but it should not penetrate through the barrel and instead it should be contained and confined within the interior of the barrel. The present disclosure is directed to and describes an embodiment of the hardwall fan case although it may also have applications for softwall fan case arrangements.

Figure 1:
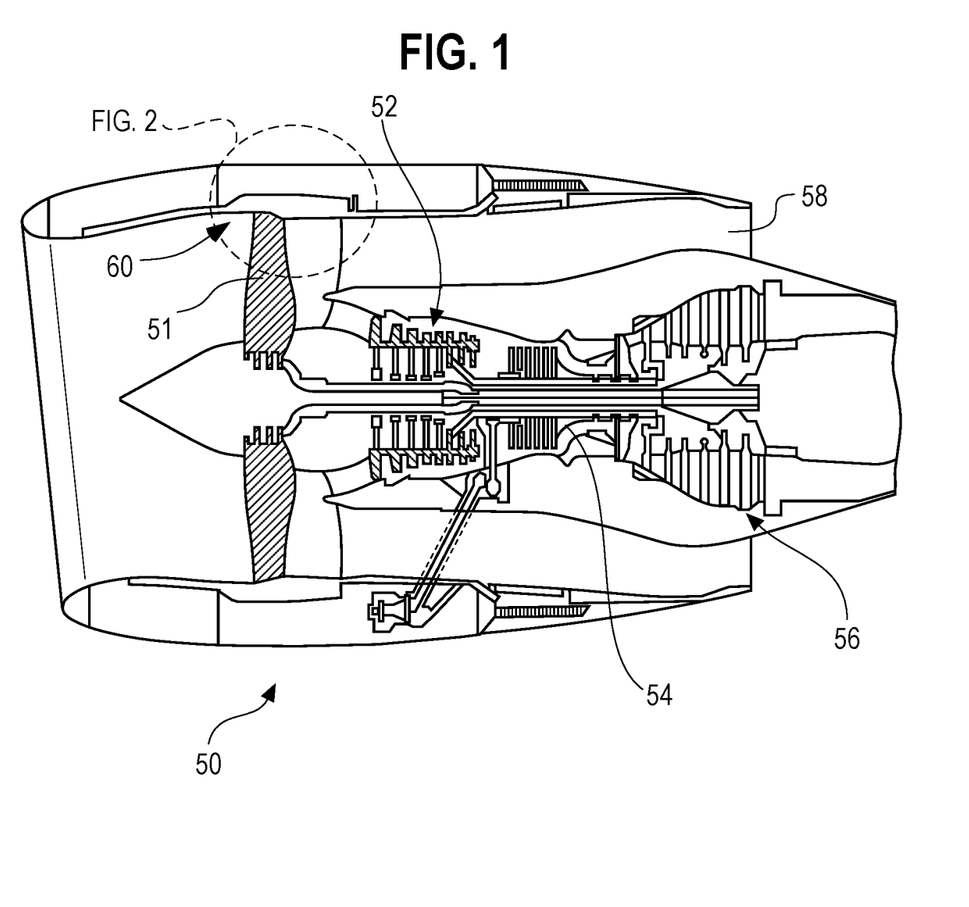
FIG. 1 depicts a side sectional view of a turbine engine including a hardwall fan containment case.

Referring to FIG. 1, a gas turbine engine 50 is illustrated having a fan 51, a compressor section 52, a combustor 54, and a turbine section 56, which together can be used to generate useful power. Air enters the gas turbine engine 50, is compressed through the action of the compressor 52, mixed with fuel, and combusted in the combustor 54. The turbine 56 is arranged to receive a fluid flow such as a combusted mixture of air and fuel from the combustor 54 and extract useful work from the fluid flow. The gas turbine engine 50 may have a hardwall fan containment case 60 and can be used to power for example, aircraft such as helicopters, airplanes, and unmanned space vehicles. Further, the present disclosure contemplates utilization of the hardwall fan containment case 60 in other applications that may not be aircraft related such as industrial applications, power generation, pumping sets, naval propulsion, weapon systems, security systems, perimeter defense/security systems, and the like known to one of ordinary skill in the art.

Figure 2:
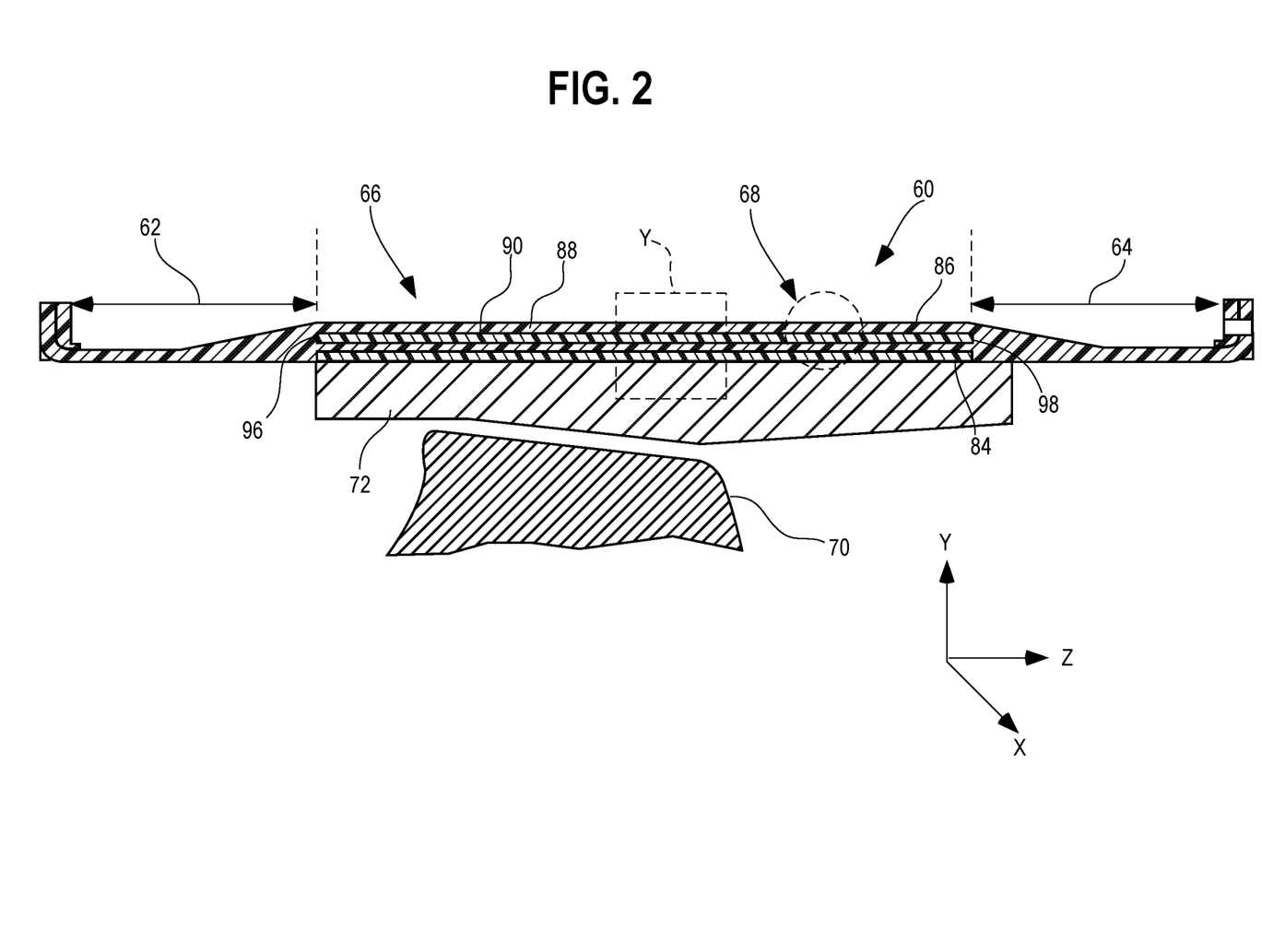
FIG. 2 depicts a cross sectional detailed view of the hardwall fan containment case of FIG. 1.

Referring to FIG. 2, one embodiment of a hardwall fan containment case (fan case) 60 includes a barrel 68 and a fan track liner 72. The barrel 68 has a forward portion 62 and an aft portion 64 and a middle portion 66 in between the forward portion 62 and the aft portion 64. The hardwall fan case 60 is located outboard of rotor fan blades 70. The relative positions of components are described with reference to the axis of rotation of the turbofan engine. The axial direction is denoted by Z, the radial direction is denoted by Y, and the tangential direction is denoted by X. In this example, the barrel 68 has an inboard innermost surface 84, and an outboard outermost surface 86. The innermost surface 84 is closer to the fan blades 70, and the outermost surface 86 is farthest away from the fan blades 70 in the radial direction.

The fan track liner 72 is positioned between the barrel 68 and the fan blades 70 and is immediately outboard of the fan blades 70. The fan track liner 72 may be abradable and can be constructed in a variety of manners and can be made of one or more materials such as metallic, plastic, composite, honeycomb, or others known in the art. For example, the fan track liner 72 can be constructed as a single article or as an article that has portions fastened or bonded to one another in the form of a layered composition. The fan track liner 72 can be cast, stamped, molded, or made in a composite construction. In short, the fan track liner 72 can take on any variety of constructions.

To prevent a potential failure of gas turbine engines, the stability and structural integrity of the barrel 68 is of great concern. In place of different kinds of metals, a carbon fiber composite 88 (carbon composite) is used as a component of the barrel 68. This provides for a reduction in the overall of weight of the fan case 60 and also maintains the structural integrity and strength of the barrel 68. The carbon composite 88 may be formed from layers of carbon fiber combined with epoxy resin. One of the desirable physical characteristics of the carbon composite 88 is that it can catch and hold a penetrating projectile such as a portion of the fan blade 70 in the FBO event. Another component is poly p-phenylene-2,6-benzobisoxazole commonly known as (PBO) 90 that is also provided in the barrel 68 and has a number of desirable characteristics. The PBO is commonly known by the brand name of Zylon®. The PBO may also be in a composite form combined with a polymer such as epoxy resin. Furthermore, the PBO 90 may be in a form of layers of fiber. One of the desirable characteristics of the PBO composite 90 is that it is resistant to cutting such that when the fan blade 70 or other fast moving high energy debris hits the PBO composite 90 the amount of cutting is minimized. Another desirable characteristic of the PBO composite 90 is that it has a lower density compared to other comparable fibers. Kevlar has been traditionally used in fan containment cases to resist cutting by a fan blade in the event of the FBO. Here, the incorporation of the PBO composite 90 as a component of the barrel 68 provides for a lighter weight fan case as well as increased resistance to cutting by a broken off high energy fan blade or other debris.

As described below, the barrel 68 includes a number of aspects in terms of different physical arrangements of the carbon composite 88 and the PBO composite 90 within the barrel 68. A common feature of the aspects of the barrel 68 disclosed herein is that a band of carbon composite 88 constitutes the outermost surface of the barrel 68. It should be noted that, as described hereinafter, a band signifies one or multiple layers of a material such as for example, carbon or PBO, therefore, the band of carbon composite includes one or multiple layers of carbon fibers or similarly the band of PBO composite 90 includes one or multiple layers of PBO fibers. In the aerospace industry, hardware such as machines, equipment, turbine engines or the like are manufactured for long-term use and must meet certification standards for extended operations. Therefore, it is crucial that the hardware withstand negative effects of mechanical and physical as well as environmental impacts over the long-term. The PBO composite 90 is more susceptible to environmental degradation over time than the carbon composite 88. Thus, to protect and shield the PBO composite 90 from environmental degradation, it is embedded inside bands of carbon composite 88.

Figure 3:
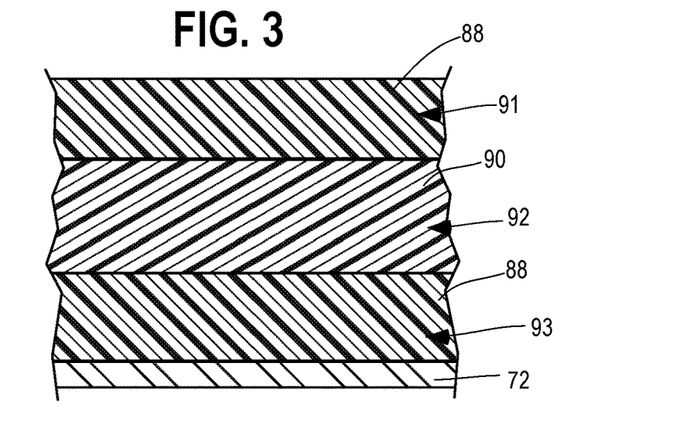
FIG. 3 depicts an enlarged, fragmentary, cross sectional view along a plane Y in a radial direction of a portion of a barrel having a three-band arrangement of carbon and PBO material where a carbon band of material is the innermost surface of the barrel according to a first aspect of the hardwall fan containment case.

Referring to FIG. 3, an enlarged, fragmentary, cross sectional view along the plane Y of the middle portion of the barrel 68 with the fan track liner 72 shows a three-band arrangement of the carbon and PBO within the barrel 68 as a first aspect of the fan case. In this arrangement, a first band 91 of carbon composite 88 provides the outermost surface of the barrel 68. Disposed immediately adjacent to the first band 91 of carbon composite 88 is a second band 92 of PBO composite 90 inboard of the fan case 60. A third band 93 of carbon composite 88 is disposed further inboard of the second band 92 of PBO composite 90 and as a result, the second band 92 of PBO composite 90 is fully surrounded by the first and third bands 91, 93 of carbon composite 88. It is known that exposure to humidity can cause degradation of the PBO composite over time. Therefore, by fully surrounding and encapsulating the PBO composite 90 with carbon composite 88 such that the PBO composite 90 is embedded within the carbon composite 88, the PBO composite 90 would be insulated from harsh environmental effects. Moreover, to further insulate and protect the PBO composite from environmental degradation, thicknesses of the bands of carbon composite 88 entombing the band of PBO composite 90 may be at least as thick as a thickness of the band of PBO composite 90. It should be noted that by making the thicknesses of the bands of carbon composites 88 substantially thicker than the thickness of the bands of PBO composite 90, the PBO composite 90 would be more fully entombed within the carbon composites 88 and as a result the PBO composite 90 would be even less subject to environmental degradation.

Figure 4:
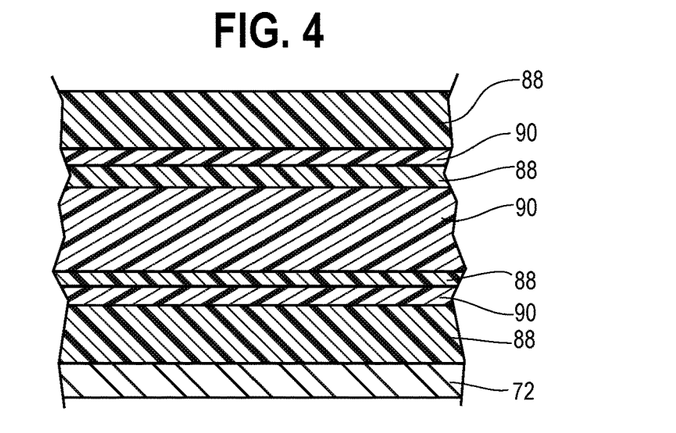
FIGS. 4-6 depict enlarged, fragmentary, cross sectional views along the plane Y of the portion of the barrel having more than three bands of carbon and PBO material according to variations of the first aspect of the hardwall fan containment case.
Figure 5:
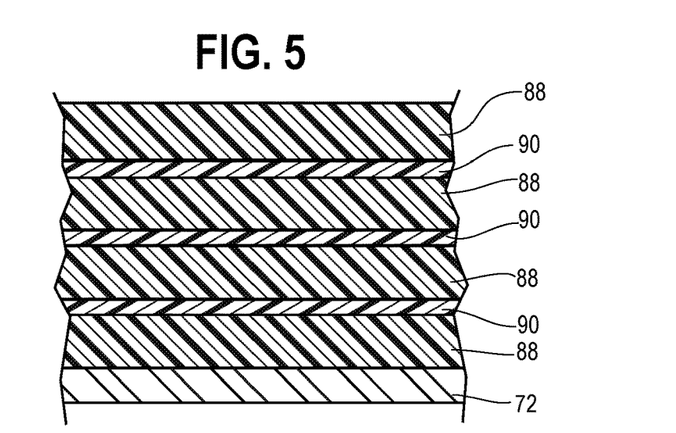
Figure 6:
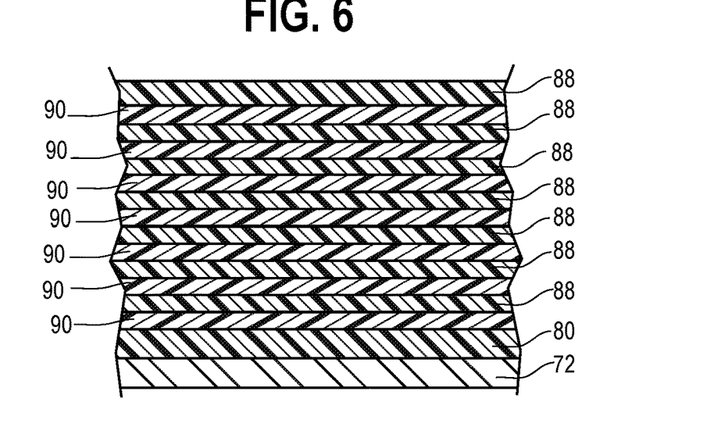

FIGS. 4-6, show several variations of the first aspect of the fan case as having more than three bands of carbon composite and PBO composite embedded within the carbon composite as components of the barrel 68. It should be noted that the innermost band closest to the fan blade 70 in all of these arrangements is a carbon composite band. Therefore, in the event of a FBO, the broken off fan blade 70 will initially come into contact with the band of carbon composite 88 that is the innermost band and cuts through the carbon fiber composite layers. The succeeding band of material is a band of PBO composite 90 that is fully entombed between the innermost carbon composite band and another band of carbon composite disposed outbound of the PBO composite band. The PBO layers of the band of PBO composite characteristically resist a cutting action by the broken off fan blade 70. As described above, the carbon composite layers of each band of carbon composite 88 insulate and protect the bands of PBO composite from degradation and also resist further penetration of a broken fan blade 70 by catching and holding the broken off blade 70 as the blade pushes through the barrel 68 in its trajectory.

Figure 7:
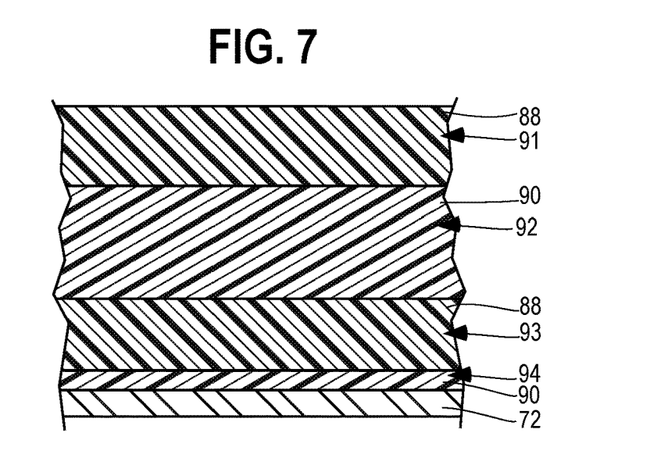
FIG. 7 depicts another enlarged, fragmentary, cross sectional view along the plane Y of the portion of the barrel having a four-band arrangement of carbon and PBO material where the PBO band of material is the innermost surface of the barrel according to a second aspect of the hardwall fan containment case.
Figure 8:
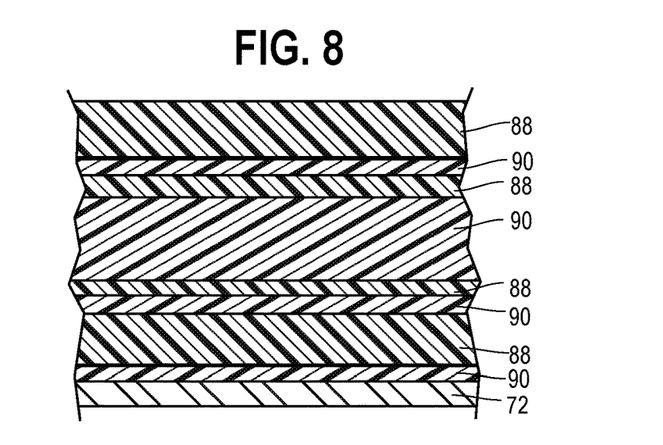
FIGS. 8-11 depict enlarged, fragmentary, cross sectional views along the plane Y of the portion of the barrel having more than four bands of carbon and PBO material according to variations of the second aspect of the hardwall fan containment case.
Figure 9:
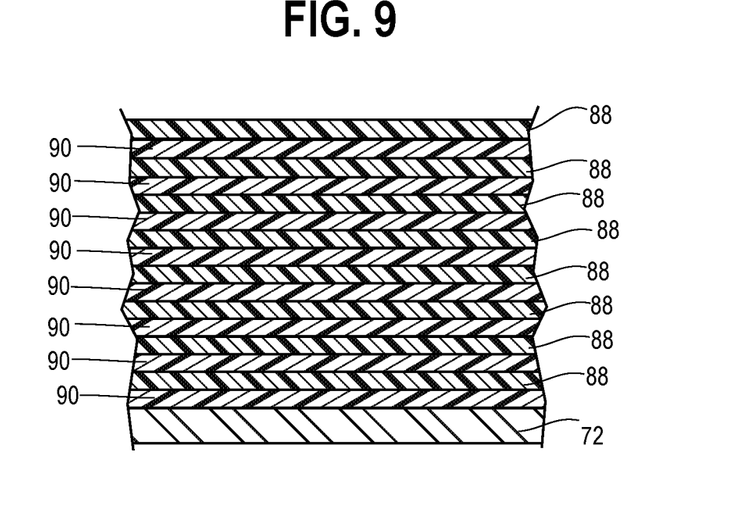
Figure 10:
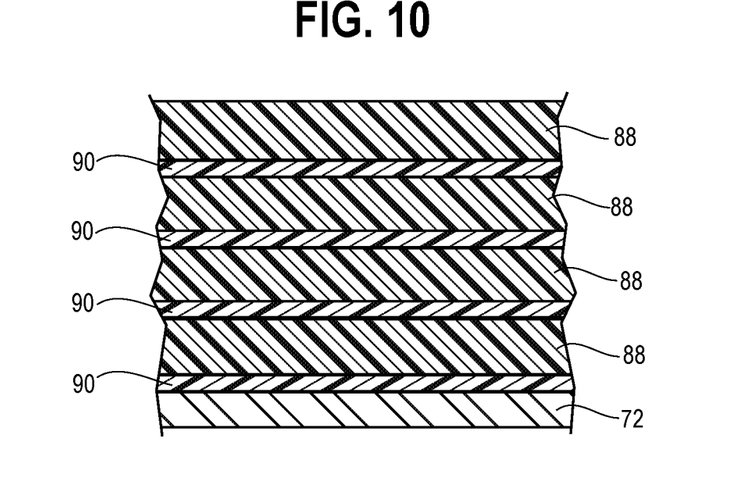
Figure 11:
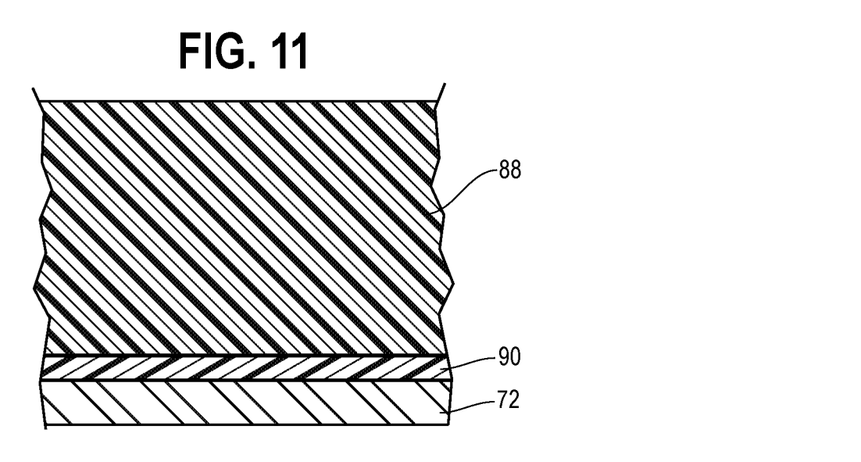

Referring to FIG. 7, another enlarged, fragmentary, cross sectional view of the middle portion of the barrel 68 and the fan track liner 72 shows a four-band arrangement of the carbon and PBO as components of the barrel 68. In this arrangement, in contrast with the arrangement shown in FIG. 3, a fourth band 94 of PBO composite 90 material is disposed as the innermost surface of the barrel 68 closest to the fan blade (not shown). In this arrangement, although the PBO composite that is the innermost surface of the barrel 68 may be subject to degradation, however, another band of PBO composite 90 disposed further outboard is protected against degradation by being embedded between two bands of carbon composite material.

Referring to FIGS. 8-11, several variations of the second aspect as having more than four bands of carbon composite and PBO composite embedded within the carbon composite are shown. It should be noted that the innermost band closest to the fan blade 70 in each of these arrangements is a PBO composite band. Therefore, in the event of an FBO, the broken off fan blade will initially come into contact with the innermost band of PBO composite. The cutting action of broken off fan blade is resisted by the PBO composite layers. The next and succeeding band of material in the arrangements shown in FIGS. 8-11 is a band of carbon composite. The carbon layers of the band of carbon composite characteristically catch the broken off fan blade and impede the penetrating motion of the broken off fan blade as it pushes to penetrate the barrel 68.

Referring again to FIG. 2, it is seen that the forward, middle, and aft portions 62, 66, and 64 of the barrel 68 extend along an axial extent (Z-direction). The forward portion 62 and the aft portion 64 are thinner in cross section in relation to the middle portion 66. In the design of the turbine engine, the location of the middle portion 66 is determined based on the position of the fan blades 70 in the turbine engine such that in a FBO event a projected path taken by the broken off fan blade 70 would coincide with an impact zone on the middle portion 66. Therefore, as the broken off fan blade impacts the middle portion 66 the bands of carbon composite catch and the bands of PBO composite resist cutting of the barrel 68. As seen in FIG. 2, the thickness of each of the forward portion 62 and the aft portion 64 is reduced with distance away from the middle portion 66. Each band of PBO composite material is disposed within and confined to the middle portion 66 and does not extend axially into the thinner forward and aft portions 62 and 64. A forward edge 96 and an aft edge 98 of each band of PBO composite material are within the middle portion 66 so that they are not degraded because of the reduction in thickness of the carbon composite material in the forward portion 62 and the aft portion 64.

It should be noted that an overall thickness of the barrel 68 is determined based on several variables such a value of mass of the fan blade 70 and a rotational speed and/or acceleration of the fan blade 70 of a particular gas turbine engine. As these variables are changed depending on the type and design requirements of the different turbine engines, the amount of momentum and force generated by a broken off fan blade would be changed accordingly. Consequently, for fan blades 70 that produce larger momentum or force, the overall thickness of the barrel 68 would be larger compared to circumstances where the fan blades 70 produce smaller momentum or force. The various aspects described above and shown in FIGS. 3 through 11 demonstrate alternative arrangements in terms of the number of bands of carbon composite and PBO composite as well as the respective thicknesses of each of the bands of carbon composite and PBO composite that are determined based on the amount of momentum and force generated by the fan blades 70 in different turbine engines.

It should be noted that in some circumstances in place of the PBO composite, a dry PBO material may be utilized. A dry PBO may provide certain benefits such as, for example, an improved elongation to failure characteristic because it would not be constrained in the absence of a resin matrix. Therefore, alternatively, dry PBO patches may be included and encapsulated in pockets within the barrel 68 to improve the elongation to failure feature of the PBO with minimal effect on the structural stability of the barrel 68. The PBO composite infused with polymer such as epoxy contributes to the structural strength and stability of the barrel 68. It should be noted that a determination of as to whether to provide either the dry PBO or PBO composite separately or in combination interleaved between layers of the carbon composite 88 depends on the desired application of the barrel 68 in the turbine engine 50.

The design options for the fan containment case 60 as described herein is not limited to any specific application and may be used, for example, with military, commercial aircrafts, naval vessels or other applications.

INDUSTRIAL APPLICABILITY

As provided herein, the fan containment case may be employed in connection with a gas turbine engine, and more specifically, for example, a gas turbine engine intended to be used in a military aircraft. The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A fan containment case for a gas turbine engine comprising:
a barrel comprising:
a first band of material on an outside of the barrel, wherein the first band is made of carbon fiber composite;
second through sixth bands of material inboard of the first band, wherein each of the second through sixth bands is made of poly p-phenylene-2,6-benzobisoxazole (PBO) composite;
seventh through tenth bands, wherein each of the seventh through tenth bands is made of carbon fiber composite and the seventh band separates the second and third bands, the eight band separates the third and fourth bands, the ninth band separates the fourth and fifth bands, and the tenth band separates the fifth and sixth bands; and
an eleventh band of material inboard of the tenth band, wherein the eleventh band is made of carbon fiber composite.

2. The fan containment case of claim 1, wherein the second through tenth bands are encased by the first band and the eleventh band.

3. The fan containment case of claim 2, wherein the first band and the eleventh band comprise multiple layers of carbon fiber composite, and wherein the second band comprises multiple layers of PBO composite.

4. The fan containment case of claim 3, wherein the barrel includes along an axial extent thereof a forward portion, a middle portion, and an aft portion, wherein the forward portion and the aft portion are thinner than the middle portion.

5. The fan containment case of claim 4, wherein each of the forward portion and the aft portion is reduced in thickness with distance away from the middle portion.

6. The fan containment case of claim 4, wherein a thickness of each of the first and eleventh bands is at least as thick as a thickness of the second band.

7. The fan containment case of claim 4, wherein the second band is disposed in the middle portion of the barrel.

8. The fan containment case of claim 1, further comprising a twelfth band of material inboard the fifth band of material, wherein the sixth band is made of PBO composite.

9. The fan containment case of claim 8, further comprising a fan track liner disposed on the twelfth band.

10. The fan containment case of claim 1, wherein each of the first through eleventh bands is selectively located in a projected path of a fan blade out such that a failed blade is adapted to be impacted onto the selected location of the first through eleventh bands.

11. A gas turbine engine, comprising:
a fan containment case including a barrel comprising:
a first band of material on an outside of the barrel, wherein the first band is made of carbon fiber composite;
second through sixth bands of material inboard of the first band, wherein each of the second through sixth bands is made of poly p-phenylene-2,6-benzobisoxazole (PBO);
seventh through tenth bands, wherein each of the seventh through tenth bands is made of carbon fiber composite and the seventh band separates the second and third bands, the eight bands separates the third and fourth bands, the ninth band separates the fourth and fifth bands, and the tenth band separates the fifth and sixth bands; and
an eleventh band of material inboard of the tenth band, wherein the eleventh-band is made of carbon fiber composite.

12. The gas turbine engine of claim 11, wherein the second through tenth bands are encased by the first band and the eleventh band.

13. The gas turbine engine of claim 12, wherein the first band and the eleventh band comprise multiple layers of carbon fiber composite, and wherein the second band comprises multiple layers of dry PBO.

14. The gas turbine engine of claim 13, wherein the fan containment case is a hardwall containment casing.

15. The gas turbine engine of claim 14, wherein the barrel includes along an axial extent thereof a forward portion, a middle portion, and an aft portion, wherein the forward portion and the aft portion are thinner than the middle portion such that each of the forward portion and the aft portion is reduced in thickness with distance away from the middle portion.

16. The gas turbine engine of claim 14, wherein a thickness of each of the first and eleventh bands is at least as thick as a thickness of the second band.

17. The gas turbine engine of claim 14, wherein the second band is disposed in the middle portion of the barrel.

18. The gas turbine engine of claim 11, further comprising a twelfth band of material inboard the eleventh band of material, wherein the twelfth band is made of dry PBO.

19. The gas turbine engine of claim 18, further comprising a fan track liner disposed on the twelfth band.

20. The gas turbine engine of claim 11, wherein each of the first through eleventh bands is selectively located in a projected path of a fan blade-out such that a failed blade is adapted to be impacted onto the selected location of the first through eleventh bands.

* * * * *